United States Patent [19]

Hamilton et al.

[11] Patent Number: 4,457,783

[45] Date of Patent: Jul. 3, 1984

[54] STABILIZED OPAQUE FORM OF C.I. PIGMENT YELLOW 74

[75] Inventors: Alexander Hamilton, Cathcart; Alexander Hope MacLennom, Paisley; Christopher Newton, Johnstone, all of Scotland

[73] Assignee: Ciba-Geigy Corporation, Ardsley, N.Y.

[21] Appl. No.: 435,525

[22] Filed: Oct. 20, 1982

[30] Foreign Application Priority Data

Oct. 31, 1981 [GB] United Kingdom ............... 81 32859

[51] Int. Cl.³ .............................................. C09B 29/32
[52] U.S. Cl. ................................................. 106/288 Q
[58] Field of Search ..................................... 106/288 Q

[56] References Cited

U.S. PATENT DOCUMENTS

| | | | |
|---|---|---|---|
| 3,725,101 | 4/1973 | Kuhne et al. | 106/288 Q |
| 4,251,441 | 2/1981 | Frölich et al. | 260/193 |

FOREIGN PATENT DOCUMENTS

| | | |
|---|---|---|
| 12944 | 7/1980 | European Pat. Off. . |
| 247985 | 1/1948 | Switzerland . |
| 537070 | 6/1941 | United Kingdom . |
| 557415 | 11/1943 | United Kingdom . |
| 1046108 | 10/1966 | United Kingdom . |
| 1058017 | 2/1967 | United Kingdom . |
| 1348509 | 3/1974 | United Kingdom . |
| 1356254 | 6/1974 | United Kingdom . |
| 1425522 | 2/1976 | United Kingdom . |
| 1428633 | 3/1976 | United Kingdom . |
| 2000172 | 1/1979 | United Kingdom . |
| 1578988 | 11/1980 | United Kingdom . |

OTHER PUBLICATIONS

Color Index, vol. 4, 3rd Ed., (1971), p. 4024.
CA, 93, 169651u, (1980).

Primary Examiner—Helen M. McCarthy
Attorney, Agent, or Firm—Luther A. R. Hall

[57] ABSTRACT

A stabilized opaque form of C.I. Pigment Yellow 74 comprises a mixture of
(a) 99.0 to 80.0 wt. % of Color Index Pigment Yellow 74;
and
(b) 1.0 to 20.0 wt. % of a different monoazo yellow pigment based on acetoacet-2-anisidide. These pigment products are distinguished by improved storage stability when incorporated into applicational media.

4 Claims, No Drawings

STABILIZED OPAQUE FORM OF C.I. PIGMENT YELLOW 74

The present invention relates to novel forms of C.I. Pigment Yellow 74 which are stable in application systems.

Colour Index Pigment Yellow 74 is a commercially-important pigment, having been used successfully in many applications, e.g. in decorative alkyd paints and in alkyd/melamine-formaldehyde paints, aqueous emulsion paints and aqueous inks.

C.I. Pigment Yellow 74 is commercially available in two forms, namely a high strength, transparent version and a lower strength opaque version for applications where high lightfastness and opacity are required.

The transparent form is produced by coupling the diazonium salt of 5-nitro-2-aminoanisole on to acetoacetic-2-anisidide, heating the mixture to 70° C. and then filtering at once. On the other hand, the opaque version is produced by conducting the same coupling reaction and then heating the mixture at the boil for 1 hour prior to filtering. It is believed that the difference in strength (the transparent form has about twice the colour strength of the opaque form) is a result of the differences in the respective crystalline sizes rather than in the respective crystalline forms.

The opaque forms of C.I. Pigment Yellow 74 suffers from the serious disadvantage that it loses strength rapidly on storage in the application medium (which may be solvent or aqueous-based), possibly caused by growth in the size of the pigment particles. Various attempts to overcome this problem by conventional methods, e.g. the use of dispersing agents, or the use of starting-materials of varying quality to produce the pigment, have proved unsuccessful.

In British Patent Specification No. 2000172A mixtures of C.I. Pigment Yellow 74 with the pigment derived from 3-nitro-4-aminoanisole and acetoacetic-2-anisidide are described. These mixtures, however, are said to be marked by high tinctorial strength, high gloss and very good transparency. This teaching, therefore, has no relevance to the opaque version of C.I. Pigment Yellow 74 or to the storage stability problems peculiar to it.

It is an object of the present invention to provide a new version of the opaque form of C.I. Pigment Yellow 74 which overcomes the problem of colour strength loss on storage in applicational systems.

Surprisingly, we have now found that by incorporating into opaque C.I. Pigment Yellow 74 a minor proportion of a different monoazo yellow pigment, prepared from the same coupling component used to produce C.I. Pigment Yellow 74 but from a different amine, the resulting pigment has greatly improved stability in aqueous and non-aqueous systems whilst exhibiting initial tinctorial properties at least equivalent to those exhibited by conventionally-produced opaque C.I. Pigment Yellow 74.

Accordingly, the present invention provides a stabilised opaque form of C.I. Pigment Yellow 74 containing a mixture of (a) 99.0 to 80.0, preferably 97.5 to 92.5 wt. % of C.I. Pigment Yellow 74; and (b) 1.0 to 20.0, preferably 2.5 to 7.5 wt. % of a different monoazo yellow pigment based on acetoacetic-2-anisidide;

According to the present invention, there is also provided a process for producing the new stabilised opaque form of C.I. Pigment Yellow 74 comprising forming a mixture of components (a) and (b) as hereinbefore defined.

The new mixtures of the invention may be produced by various methods, for example by:

(i) Dry mixing of components (a) and (b);

(ii) Mixing of the pigment filtercakes from components (a) and (b) followed by drying in conventional manner;

(iii) Diazotising a mixture of the respective amine precursors and coupling, boiling, filtering and drying in conventional manner;

(iv) Separate diazotisation of the respective amine precursors followed by mixing of the diazo solutions prior to coupling, boiling, filtering and drying in conventional manner;

(v) Separate diazotisation and coupling of the respective amine precursors followed by mixing of the aqueous slurries prior to boiling, filtering and drying; or (vi) Diazotising and coupling one of the amine precursors followed by the separate diazotisation of the second amine precursor then coupling; in the presence of the first pigment; prior to boiling, filtering and drying.

Of these methods, those designated (iii), (iv) and (vi), in particular (iii), are preferred.

Preferably, the component (b) is produced from one or more amines, for example, having the following formula:

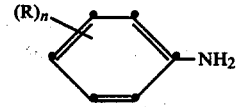

wherein n is an integer from 1 to 3 and the groups R are the same or different and each is a group which does not impart solubility in water, preferably an alkyl group having from 1 to 6 carbon atoms (in particular methyl or ethyl), an alkoxy group having from 1 to 6 carbon atoms, a halogen atom (especially chlorine) or a nitro group.

Of particular interest are the amines 4-nitro-2-aminoanisole, 4-methyl-2-nitroaniline, 2-methyl-5-nitroaniline, 3-nitro-4-aminoanisole.

In one preferred embodiment, the process according to the invention is conveniently effected by incorporating into 5-nitro-2-aminoanisole from 1.0 to 20.0% by weight, preferably from 2.5 to 7.5% by weight, of 4-nitro-2-aminoanisole and then diazotising the mixture so obtained followed by coupling with acetoacet-2-anisidide in conventional manner.

The pigment produced by this preferred process of the present invention is a mixture of two pigments.

The properties of the product of the present invention may be further improved by means of standard treatments. Such aftertreatments are for example:

(1) Addition of a water-soluble dye, for example a water-soluble monoazo dye. This technique is known for example from the U.S. Pat. No. 3,759,733, wherein likewise the methods of incorporation are described in detail.

The adsorbed soluble dye can, if required, be rendered insoluble in a later stage, for example by the formation of insoluble salts with metals of the groups IA, IB, IIA, IIB, IIIA, IIIB and VIII of the periodic system. Examples of water-soluble dyes of this type are given in the U.S. Pat. No. 3,759,733. In general there is added up to 25% by weight of the soluble dye, relative to the pigment mixture produced according to the invention. Preferably however 1 to 10% by weight is added.

(ii) Aftertreatment with a solvent: suitable solvents are in particular polar aliphatic solvents, which are at least partially miscible with water, for example $C_1$–$C_4$-alcohols, short-chain monocarboxylates, lower alkyl ketones or short-chain alkoxyalkanols or glycols. The solvent aftertreatment of pigments is described in detail in the U.S. Pat. No. 3,532,030.

(iii) Subsequent heat treatment of the pigments produced by the process according to the invention, under acidic, basic or neutral conditions.

(iv) Aftertreatment of the pigments, produced by the process according to the invention, with long-chain alcohols, esters, amines or amides, or with nonionic, cationic or anionic surface-active agents, and also with rosin-type resins. As examples of such additives there may be mentioned the basic pigment derivatives of GB No. 1,486,117. Other suitable additives are those described in GB No. 1,589,159, including carboxylic acid esters and amides such as glycerol tristearate, dicyclohexyl phthalate and oleamide, resins such as hydrocarbon resins and water-insoluble fatty alcohols such as cetyl alcohol. Rosins of all types, including their chemically-modified forms may also be used.

(v) Conversion into non-dusting free-flowing, bead products described in GB No. 1,589,159.

(vi) Conversion into non-dusting, free-flowing granules as described in GB No. 2,009,204 and GB No. 2,036,057.

The pigment products of the process of the present invention are distinguished by their improved storage stability (relative to conventionally-produced opaque form of C.I. Pigment Yellow 74), when incorporated into applicational media.

The pigments may be isolated as a dry powder and then formulated as an aqueous paste. Accordingly, the present invention also provides an aqueous pigment paste comprising the stabilised pigment mixture of components (a) and (b) according to the invention together with one or more conventional pigment paste adjuvants, especially dispersing agents, and water.

The aqueous pigment pastes may be produced by milling, e.g. in a bead mill, the pigment product of the process of the invention, water and optionally conventional adjuvants, e.g. nonionic surfactants (such as ethoxylated nonyl phenol), ethylene glycol and a biocide.

The aqueous pigment pastes of the invention are suitable for use as stable stainers for the pigmentation of aqueous colourants, especially aqueous surface coatings e.g. emulsion paints.

In the following Examples which further illustrate the present invention, all parts and proportions shown therein are by weight unless otherwise stated.

EXAMPLE 1

9.1 Parts of 5-nitro-2-aminoanisole and 0.234 parts of 4-nitro-2-aminoanisole are slurried in water containing 13.15 parts of hydrochloric acid. The mixture is diazotised with 3.86 parts of sodium nitrite in 4.5 parts of water, while maintaining the diazotisation reaction temperature at 0° C. and the whole is filtered and the filtrate made up to 120 parts at 0° C.

12.10 Parts of acetoacetic-2-anisidide are dissolved in 125 parts of water containing 2.43 parts of sodium hydroxide. The acetoacetic-2-anisidide is re-precipitated by adding 3.68 parts of 80% acetic acid in 35.5 parts of water, over 10 minutes. Then 5.92 parts of sodium acetate are added and the pH of the solution is regulated to a value of 6.5. The final volume of the coupling component is made up to 225 parts at 15° C.

Coupling is then effected over 1 hour, ensuring that excess diazo component is never present. The final pH is about 4.3. When coupling is complete, the reaction mixture is heated to the boil, and held at this temperature for 1 hour. The product is then cooled to 70° C., and the pigment is isolated by filtration, washed free of chloride ion, and the resulting filter cake dried at 70° C., to produce a stabilised opaque version of C.I. Pigment Yellow 74.

EXAMPLE 2

8.85 Parts of 5-nitro-2-aminoanisole and 0.468 parts of 4-nitro-2-aminoanisole are slurried in water containing 13.15 parts of hydrochloric acid. The mixture is diazotised with 3.86 parts of sodium nitrite in 4.5 parts of water while maintaining the reaction temperature at 0° C., the whole filtered and the filtrate made up to 120 parts.

12.10 Parts of acetoacet-2-anisidide are dissolved in 125 parts of water containing 2.43 parts of sodium hydroxide. The acetoacet-2-anisidide is re-precipitated by adding 3.68 parts of 80% acetic acid in 35.5 parts of water. 5.92 parts of sodium acetate are added and the pH value of the solution is regulated at 6.5. The final value of the coupling component is made up to 225 parts at 15° C. Coupling is then effected over 1 hour, ensuring that excess diazo component is never present. The final pH value is 4.3. When coupling is complete, the whole is heated to the boil and held at this temperature for 1 hour. The product is cooled to 70° C. and, 30 minutes prior to filtration, 0.43 parts of a nonionic surfactant (nonyl phenol condensed with six moles of ethylene oxide) are added. The reaction mixture is stirred for 30 minutes and the pigment is isolated by filtration and washed chloride-free. The resulting filter-cake is dried at 70° C. to produce a stabilised opaque form of C.I. Pigment Yellow 74, which can be incorporated readily into aqueous media.

EXAMPLE 3

435 Parts of the pigment (prepared according to Example 1 or 2) powder are slurried in 378 parts of water containing 100 parts of mono-ethylene glycol and 87 parts of a nonionic surfactant. The resulting slurry is then pre-dispersed by stirring in a high-speed homogenizer for 10 minutes, the pH is adjusted to 8–9 by the addition, if required, of 10% aqueous sodium hydroxide. The pre-dispersion is then completely dispersed by milling in conventional manner and the resulting paste is incorporated into emulsion paint and compared with a paste (dispersed using the same additives and procedure) but based on a conventional opaque version of C.I. Pigment Yellow 74. No significant colouristic differences are detected. However, after accelerated storage of the respective pastes at 40° C. over 48 hours and re-testing in emulsion paint, the paste based on a conventional opaque version of C.I. Pigment Yellow 74 has lost 20% strength relative to the stabilised version produced according to Example 1 or 2 of the present invention.

EXAMPLE 4

Diazo solution (1) is prepared in the normal fashion from 97.5 parts of 5-nitro-2-aminoanisole and made to 1300 parts at 0° C. Diazo solution (2) is prepared separately from 2.5 parts 4-nitro-2-aminoanisole and made to 50 parts at 0° C.

A coupling component slurry is prepared by dissolving 127 parts of acetoacet-2-anisidide and 26 parts sodium hydroxide in 1000 parts water und running this solution into a stirred solution of 49 parts of 80% acetic acid in 400 parts water. 65 parts of sodium acetate trihydrate are added and the pH is adjusted to 6.0 and the temperature to 15° C. The slurry is made finally to 2400 parts.

The diazo solutions (1) and (2) are mixed and then run into the coupling component slurry over approximately 1 hour. The final pH is around 4.3. The resulting slurry of yellow pigment is heated to 95°–100° C. over 30 minutes with steam and held in this temperature range for 1 hour. The slurry is cooled to 70° C. and the pigment is filtered off, washed free of water-soluble salts, and dried at 70° C. The product is an opaque form of C.I. Pigment Yellow 74 showing excellent colour strength stability when incorporated in paint systems.

EXAMPLE 5

As Example 4 except that the diazo solutions (1) and (2) are not mixed prior to coupling. Instead diazo solution (1) is run into the coupling component slurry over approximately 1 hour followed by diazo solution (2) over 5–10 minutes. The yellow pigment produced shows the same improved colour strength stability as the product of Example 4.

EXAMPLE 6

As Example 4 except that the diazo solutions (1) and (2) are not mixed prior to coupling. Instead diazo solution (2) is run into the coupling component slurry over 5–10 minutes followed by diazo solution (1) over approximately 1 hour. The resulting yellow pigment shows the same colour strength stability as that of the product of Example 4.

EXAMPLE 7

41.95 parts of 5-nitro-2-aminoanisole and 2.0 parts of 4-methyl-2-nitroaniline are mixed with 61.0 parts of 35.5% hydrochloric acid and 75.0 parts water to a smooth paste and then diazotised at 0° C. by adding a solution of 18.25 parts of sodium nitrite dissolved in 40 parts of water. When the reaction is complete the diazo solution is clarified by the addition of activated carbon black followed by filtration.

A coupling component slurry is prepared by dissolving 56.2 parts of acetoacet-2-anisidide and 11.4 parts of sodium hydroxide in 600 parts of water and then running this solution over 10 minutes into a stirred solution of 17.2 parts of glacial acetic acid in 150 parts of water. 28.0 parts of sodium acetate trihydrate are then added to the slurry which is then made to 1000 parts at 15° C. with water and/or ice.

The diazo solution is added to the stirred coupling component slurry over approximately 1 hour. The pH at the end of the coupling process is around 4.3. The yellow pigment slurry formed is heated to 95°–100° C. over 30 minutes and held in this temperature range for 60 minutes. The pigment is then filtered off, washed free of water-soluble impurities, and dried at 70° C.

When this product is incorporated in an emulsion paint system it shows better colour strength retention on storage than a product made by the same process but omitting the addition of 4-methyl-2-nitroaniline.

EXAMPLE 8

The process described in Example 7 is used exactly except that 2.0 parts of 2-methyl-5-nitroaniline are used in place of 2.0 parts 4-methyl-2-nitroaniline. The product again shows an improvement in colour strength retention when incorporated in emulsion paint systems compared with a conventional C.I. Pigment Yellow 74.

What we claim is:

1. A stabilized opaque form of C.I. Pigment Yellow 74 consisting essentially of
   (a) 99.0 to 80.0 weight % of C.I. Pigment Yellow 74; and
   (b) 1.0 to 20.0 weight % of a monoazo yellow pigment produced by coupling the diazo component derived from one or more of 4-nitro-2-aminoanisole, 4-methyl-2-nitroaniline or 2-methyl-5-nitroaniline with acetoacet-2-anisidide.

2. A stabilized pigment according to claim 1 wherein the proportion of component (a) is from 97.5 to 92.5 wt. % and that of component (b) is from 2.5 to 7.5 wt.%.

3. A process of producing a stabilized opaque form of C.I. Pigment Yellow 74 as defined in claim 1 comprising forming a mixture of components (a) and (b), as defined in claim 1, in the proportions defined in claim 1.

4. An aqueous pigment paste comprising the stabilized opaque form of C.I. Pigment Yellow 74 as defined in claim 1; one or more conventional paste adjuvants; and water.

* * * * *